Jan. 31, 1933.   P. W. CUMMINGS   1,895,880
POWER OPERATOR
Filed May 28, 1930   2 Sheets-Sheet 1
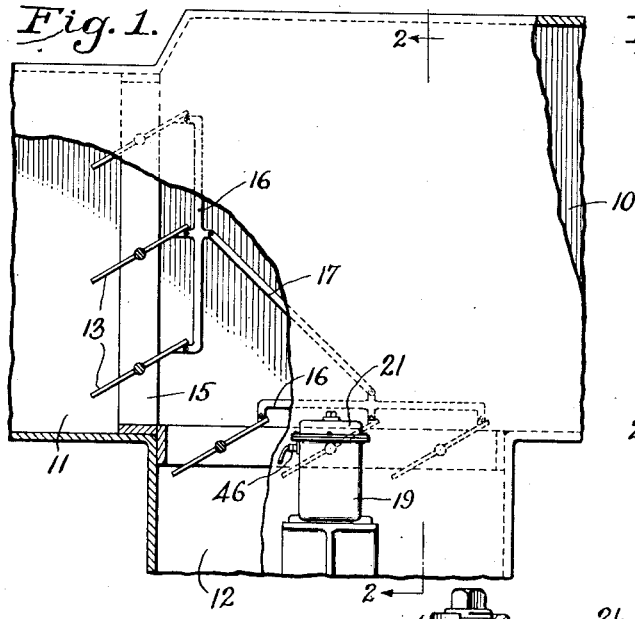
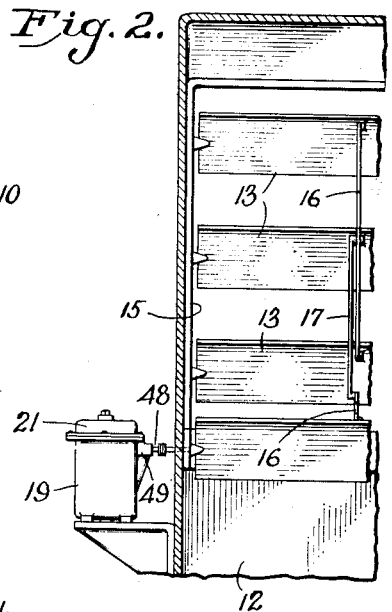
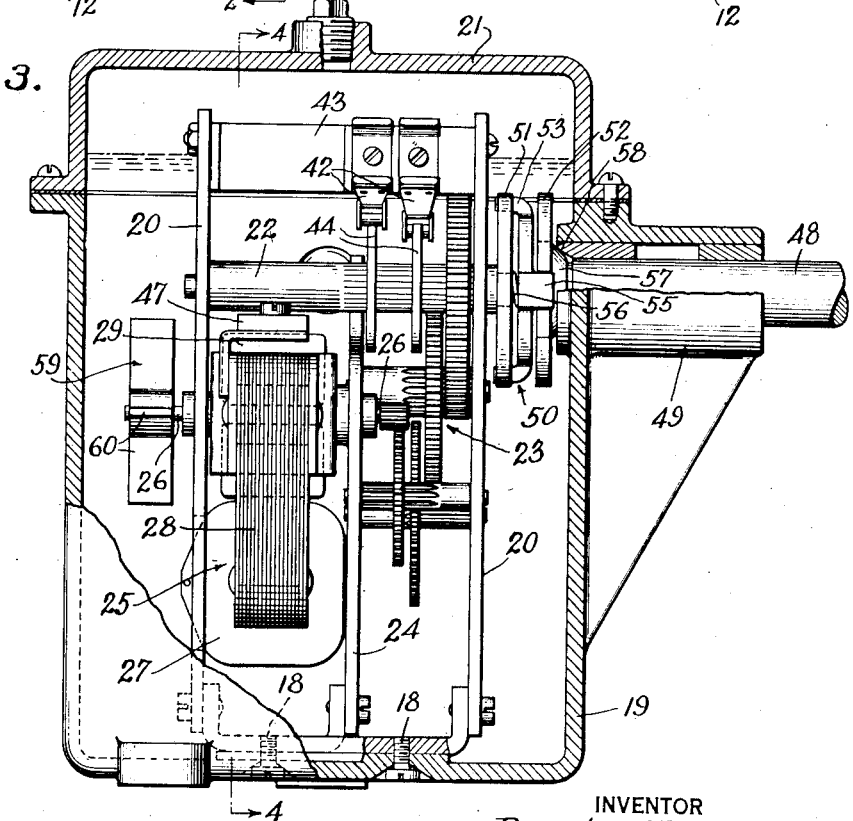
INVENTOR
Preston W. Cummings
BY
ATTORNEYS Jan. 31, 1933.   P. W. CUMMINGS   1,895,880
POWER OPERATOR
Filed May 28, 1930   2 Sheets-Sheet 2
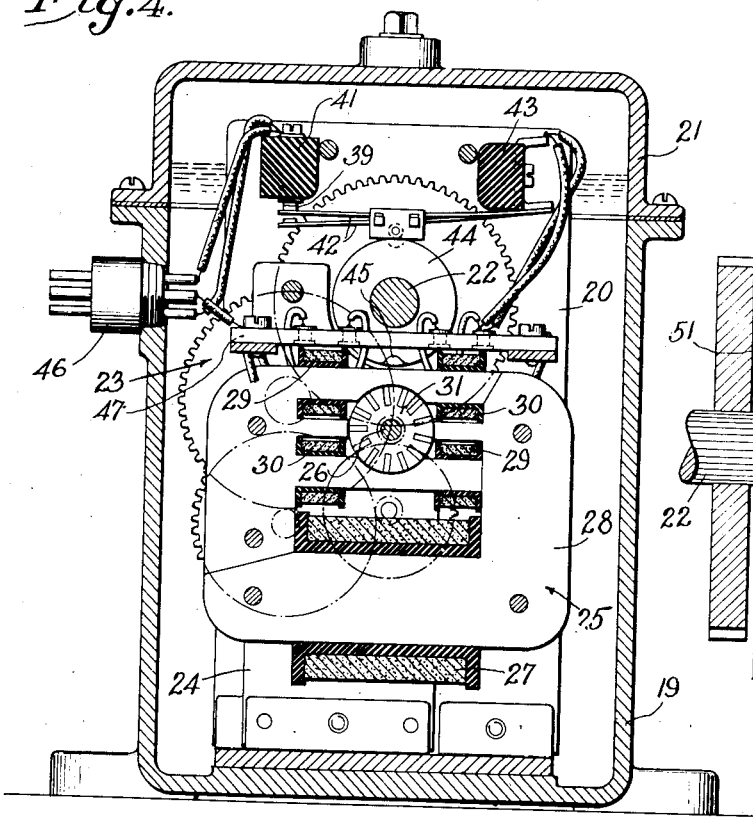
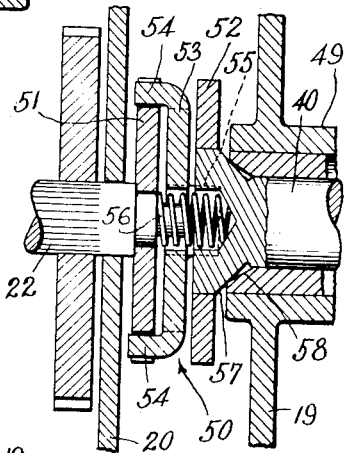
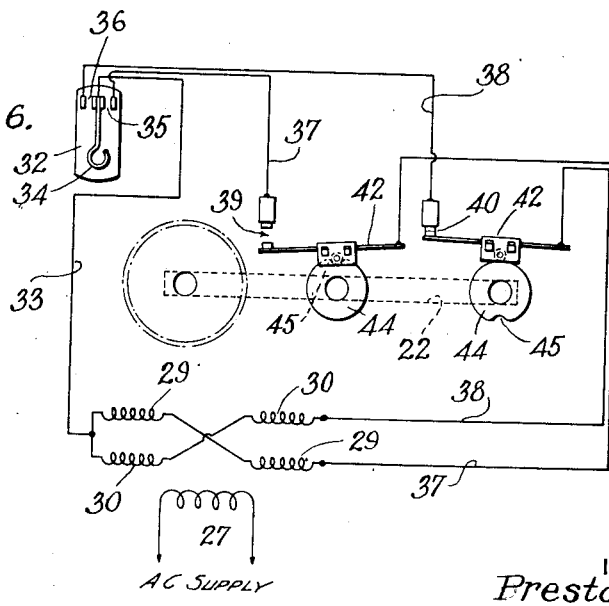
INVENTOR
Preston W. Cummings
BY
ATTORNEYS Patented Jan. 31, 1933

1,895,880

UNITED STATES PATENT OFFICE

PRESTON W. CUMMINGS, OF ROCKFORD, ILLINOIS, ASSIGNOR TO HOWARD D. COLMAN, OF ROCKFORD, ILLINOIS

POWER OPERATOR

Application filed May 28, 1930. Serial No. 456,784.

This invention relates to power operators and more particularly to an operator for imparting slow and uniform movements to a part to be driven.

The primary object of the invention is to provide a valve operator driven by an electric motor and having a novel speed governing means by which the normal rate of movement of the valve member may be changed readily to suit the varying conditions under which the operator is intended to be used, which operates in either direction of motion of the part to be driven and which exerts a load on the motor that varies automatically and inversely proportional to the load on said part so that the stalled torque of the motor is not diminished.

In carrying out this object, a vane driven from the motor in the operation of the part to be driven is arranged to rotate in a fluid, preferably a viscous liquid, which resists rotation thereby and reduces the speed of the motor by an amount determined by the effective surface area of the vane, which area may be varied conveniently over a relatively wide range.

Another object is to provide an operating unit mounted in an oil-tight casing and having its parts arranged in a novel manner such as to render them readily accessible and removable for replacement or repair.

Other objects and advantages of the invention will become apparent from the following detailed description taken in connection with the accompanying drawings, in which Figure 1 is a fragmentary view partially in section showing air mixing conduits controlled by dampers arranged for operation by a unit embodying the features of the present invention.

Fig. 2 is a section taken along the line 2—2 of Fig. 1.

Fig. 3 is an elevational view of the operating unit with a part of the enclosing casing shown in section.

Fig. 4 is a sectional view taken along the line 4—4 of Fig. 3.

Fig. 5 is a sectional view of a universal coupling embodied in the operator.

Fig. 6 is a schematic view and wiring diagram of the control mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the illustrative embodiment shown in the drawings, the improved operator is utilized to actuate a valve of the damper type by which the temperature of air discharged into a single conduit 10 may be regulated accurately by controlling the flow of cool and heated air through separate inlet ducts 11 and 12. The proportion of hot and cold air delivered to the mixed air conduit is determined by the relative positions of separate dampers in the cold and hot air ducts, each damper comprising a plurality of flat vanes 13 journaled on central end trunnions in a frame 15 near the duct outlet.

To move the vanes of each damper in unison, one edge of each vane is pivotally connected to a bar 16 which is joined by a link 17 to the bar of the other damper. With this arrangement, one damper will be open when the other is completely closed, that is, when the vanes of the latter are disposed in a common plane. Thus by shifting the link 17 into different positions any desired proportion of hot and cold air may be obtained and the temperature in the conduit 10 maintained at the desired value.

In the present instance the operator proper is mounted on a frame disposed within and secured by screws 18 to the bottom of a casing 19 which constitutes a receptacle for containing lubricating oil to a level such as to immerse the major parts of the operator. The frame is composed of spaced standards 20 upstanding from the bottom of the casing with their upper ends enclosed by a removable cover 21.

Journaled in the upper ends of the standards 20 is a shaft 22 which is driven from a train 23 of spur gears supported between one standard 20 and an intermediate standard 24 and constructed to effect a relatively large reduction in the speed of the driving motor 25 whose shaft 26 is connected with the high speed terminal gear of the train. The motor is mounted on the side of the frame opposite the gear train being supported below the shaft 22 by the standards 20 and 24.

Preferably the motor is of the single phase induction type having a main field winding 27 inclosing a two pole stator 28 and adapted to be energized constantly from a source of alternating current. To create a torque for initiating rotation of the motor in either direction, two sets 29 and 30 of shading coils are mounted on the stator poles and each acts in a manner well understood in the art to produce a shifting magnetic field across the pole face to which the rotor 31 is exposed. By rendering one or the other set of shading coils operative, the motor may be started in either direction, the extent of such movement being determined by the length of time during which the shading coils are operative.

While the starting of the operator may be governed by any desired instrumentality, a thermostat 32 is shown herein arranged to close circuits through the different shading coils selectively and automatically. For this purpose, a common terminal of the shading coils is connected by a conductor 33 to the tongue of the thermostatic element 34 which cooperates with spaced contacts to form two switches 35 and 36. The latter are connected respectively by conductors 37 and 38 to the insulated terminals of the shading coils 29 and 30.

When the temperature to which the thermostat is positioned to respond falls below the range predetermined by the setting of the thermostat, the circuit through one set of shading coils will be closed and the motor will start to rotate in a direction to open the warm air damper and close the cold air damper, thereby increasing the temperature of the mixed air. In a similar way, reverse movement of the dampers will be initiated when the thermostat detects an increase in temperature and starts the motor in the reverse direction.

In order to limit the movement of the shaft 22 to the quarter revolution required to move either damper from open to closed position, switches 39 and 40 are interposed in the conductors 37 and 38 and adapted to be opened as incidents to the movement of the shaft. These switches are disposed in the upper portion of the enclosing casing and each is formed by a stationary contact on an insulating block 41 and a movable contact on a spring arm 42 secured to a block 43 and acting as a follower for a cam 44 mounted on the end portion of the shaft 22 which carries the terminal gear of the train 23. When a notch 45 on either cam is presented to the associated arm 42, the latter is allowed to move in a direction to open its switch, thereby preventing continued operation of the motor in the same direction but permitting reverse rotation.

The switches 39 and 40 and their associated binding terminals are thus located so as to be readily accessible after draining the oil from the casing and removing the cover 21. The conductors 33, 37 and 38 and the current supplying conductors are led into the casing 19 through a plug 46 and their ends are removably connected within the casing to the terminals for the different motor windings which terminals are supported by an insulated bar 47. The latter is located just above the motor and all of the terminals are conveniently accessible by reason of the location of the cams 44 at the opposite end of the shaft 22. Thus the conductors can be disconnected readily from the power unit to permit removal of the latter from the casing.

The movement of the shaft 22 is imparted to the dampers through the medium of a shaft 48 projecting through one side of the casing 19 and journaled in an elongated bearing 49. The outer end of this shaft is coupled to the extended trunnion of one of the damper vanes 13.

Within the casing, the adjacent ends of the shafts 22 and 48 are connected by a universal coupling 50 which permits the operating unit to be removed readily from the oil bath for repair or adjustment. Referring to Figs. 3 and 5, this coupling comprises disks 51 and 52 rigid respectively with the adjacent ends of the two shafts and a universal plate 53 having two lugs 54 projecting into diametrically opposite notches in the disk 51 and similar lugs 55 extending into notches in the disk 52. The universal joint thus formed permits the two shafts to be disconnected by bodily movement of the operating unit in an axial direction away from the shaft 48. In this way, the operating unit may be removed conveniently from the oil bath after removal of the screws 18 by which the operator is secured to the casing.

Incorporated in the universal joint construction is a means which forms an effective oil seal between the shaft 48 and its bearing. This means comprises a coiled spring 56 mounted on the reduced end of the shaft 22 and acting in compression to urge the shaft 48 outwardly. The enlarged conical surface 57 of the latter is thereby pressed tightly into a seat 58 in the shaft bearing which effectually prevents escape of oil from the casing.

In order that the operator above described will be adapted for universal use under the different conditions encountered in the use of dampers in air conditioning systems, a simple and effective means is provided for enabling the speed of operation of the motor to be adjusted over a relatively wide range. For this purpose, advantage is taken of the fact that a fluid such as the oil in the casing 19 offers a resistance to the rotation of a body having a vane surface immersed in the fluid, which resistance is proportional to the speed of rotation of the motor and therefore changes automatically with variation in the load imposed upon the motor by the valve. The speed governing means herein employed is in the form of a propeller or paddle wheel 59 removably mounted on one of the high speed shafts of the operator, preferably the motor shaft 26 and having a plurality of vanes or blades 60.

In the operation of the motor in opposite directions, the opposite side surfaces of the vanes move broadwise through and displace a considerable quantity of the oil which thereby exerts a resisting force on the motor and prevents it from developing normal speed. The decrease in the motor speed and therefore the rate of movement of the damper is, of course, dependent upon the size of the effective surface area of the propeller vanes and the viscosity of the liquid. Thus, by simply replacing the wheel 59 by one having larger or smaller vanes, the workman installing the operator adjusts the speed of the operator quickly and conveniently to suit the particular conditions under which the operator is used. Substitution of different gears or other impracticable methods of speed changing are thus avoided. The present speed adjusting means is also advantageous in that it permits the speed of the damper to be reduced without increasing the torque on the driven shaft, thereby permitting the motor to be stalled before damage is done to the parts in the event that the damper becomes blocked.

By immersing the propeller in a relatively viscous fluid such as oil, a relatively small propeller may be employed which lends to the compactness of the operator as a whole in that a smaller gear train may be employed in order to produce the reduction in the motor speed required to effect a slow and graduated movement of the dampers.

The adjustable speed governor thus provided is particularly suited for use in the environment above described because it operates automatically as an incident to rotation of the motor and effects a reduction in the motor speed wihout decreasing the available torque of the motor. This is for the reason that torque exerted by the liquid resisting rotation of the motor varies with the square of the speed of the propeller. Therefore, as the load on the motor increases due to a change in the damper position or other causes, the speed of the motor is reduced in the above ratio which effects a corresponding reduction in the torque applied to the motor shaft by the oil. When the paddle wheel is at a standstill, the full motor torque is available. In this way, the speed governor adjusts itself automatically to the varying load conditions with the result that the dampers may be started readily and caused to operate at a substantially uniform rate.

Another advantage of the present type of speed governor is that the same resisting torque is exerted regardless of the direction of rotation of the motor. This is because the opposite side surfaces of the vanes of the paddle wheel are of the same size and placed at the same inclination relative to the motor shaft. The operator is thus adapted to drive the driven shaft at the same speed in either direction of motor rotation.

I claim as my invention:

1. A power operator for imparting a slow and uniform motion to a part to be driven comprising, in combination, a casing constituting a receptacle for liquid lubricant, a shaft projecting from said casing and having a driving connection with said part, a power unit for driving said shaft immersed in the lubricant in said casing and including an electric motor and a speed reduction gearing driven thereby, and means for governing the rate of motion of said part comprising an interchangeable paddle wheel carried by the shaft of said motor and having a vane which is moved broadwise through the lubricant in the operation of the motor whereby to determine the speed of rotation of the motor.

2. A power operator for imparting a slow and uniform motion to a part to be driven comprising, in combination, a casing containing liquid lubricant, a shaft journaled in said casing and projecting therethrough for connection with said part, said shaft having an enlarged conical surface near one end of its bearing, an electric driving unit immersed in said lubricant and having a shaft coupled to the inner end of said first mentioned shaft, and means yieldably urging said shaft in an axial direction to press said conical surface against said bearing and thereby prevent the escape of lubricant through the latter.

3. A power operator for imparting a slow and uniform motion to a part to be operated comprising, in combination, a receptacle open at its upper end and containing liquid lubricant, a rotatable shaft projecting through said receptacle for connection with said part, a unitary power driving mechanism including a frame mounted within said receptacle, an electric motor and a shaft driven from said motor and mounted on said frame with one end adjacent said first mentioned shaft when the mechanism is in operative position, and a quick detachable universal coupling between the ends of said shafts permitting bodily removal of said mechanism from the receptacle.

4. A power operator of the character set forth comprising, in combination, an upright frame, a shaft mounted near the upper end of said frame, an electric induction motor supported by said frame below said shaft, switch means for controlling the motor mounted on said frame above the shaft, a multiplying gear train supported in said frame and interposed between the shaft and the motor, a casing wholly enclosing said frame and having a shaft to be driven mounted in one wall thereof and connected with said shaft in the frame, said casing containing a bath of oil in which said motor and gear train are immersed, and means driven by the motor and operable by displacement of the oil in the casing to exert a retarding effect on said motor.

In testimony whereof, I have hereunto affixed my signature.

PRESTON W. CUMMINGS.